United States Patent [19] [11] Patent Number: 5,166,509
Curran [45] Date of Patent: Nov. 24, 1992

[54] OPTICAL MODULATOR NOISE NONLINEARITY REDUCTION CIRCUIT

[75] Inventor: Mark E. Curran, Oceanside, Calif.

[73] Assignee: Tacan Corporation, Carlsbad, Calif.

[21] Appl. No.: 610,958

[22] Filed: Nov. 9, 1990

[51] Int. Cl.⁵ ............................................... G01J 1/32
[52] U.S. Cl. ..................................... 250/205; 359/187
[58] Field of Search ................... 250/205, 551, 227.12, 250/214 R, 214 C; 359/187, 180, 183, 161; 372/31

[56] References Cited

U.S. PATENT DOCUMENTS

| 4,071,751 | 1/1978 | Waksberg | 250/205 |
| 4,162,398 | 7/1979 | Kayanuma | 250/205 |
| 4,198,675 | 4/1980 | Moore | 250/205 |
| 4,672,192 | 6/1987 | Muka et al. | 250/205 |
| 4,709,417 | 11/1987 | Kuwabara | 359/180 |
| 5,073,983 | 12/1991 | Pfizenmayer | 359/187 |

Primary Examiner—David C. Nelms
Assistant Examiner—Michael Messinger
Attorney, Agent, or Firm—Brown, Martin, Haller & McClain

[57] ABSTRACT

An optical modulator or laser source has a detector for detecting its output signal and for producing a corresponding output signal. A tapping device is connected to tap off a portion of the input modulation signal as a reference signal. The reference signal is compared and subtracted from the detector output signal by a subtraction unit in order to produce an error output signal which will be proportional to the laser noise/distortion components. This error signal is amplified and connected to an external modulator linked to the laser optical output and intensity modulates the laser output signal by the error signal in order to reduce or cancel the noise and distortion components in the signal.

10 Claims, 2 Drawing Sheets

OPTICAL MODULATOR NOISE NONLINEARITY REDUCTION CIRCUIT

REFERENCE TO RELATED APPLICATIONS

This application is related to my co-pending application entitled "Optical Transmission System", filed on even date herewith.

BACKGROUND OF THE INVENTION

The present invention relates generally to optical transducers such as laser diodes and solid state laser/external modulator combination, and is particularly concerned with a circuit or device for reducing or cancelling laser noise or nonlinearity components in the external modulator output signal.

The use of fiber optics for remote, high speed transfer of analog data having different frequencies has been limited up to now by the limited dynamic range and fidelity of currently available optical modulators or laser sources. The laser diode sources which can be directly modulated, have relatively high noise levels which can mask weak signals. The most obvious solution to this problem would be to develop a laser source which generates less inherent relative intensity noise (RIN). Laser manufacturers are aware of this and are currently investing considerable research efforts and expense to improve RIN. However, the best currently available laser sources produce equivalent noise figures of around 50 to 60 dB, which are not normally acceptable for remote sensor processing. Reduction of the inherent noise level in the laser source itself is likely to considerably increase the cost of the laser source. Laser sources which exhibit much better noise levels require that modulation be accomplished externally. The external modulator uses a continuous-wave low noise solid state laser as the optical source. Thus, the RIN noise does not limit the transducer's dynamic range. Rather the nonlinearity of the device limits the dynamic range. The improved laser noise level is obtained at the expense of distortion produced by the modulator. The dynamic range is also limited but by reason of distortion created by the modulator rather than due to the noise floor.

SUMMARY OF THE INVENTION

It is an objective of this invention to provide a means for reducing noise/nonlinearity in optical transducers.

According to the present invention, an optical transducer noise/nonlinearity reduction circuit is provided, comprising an optical external modulator or laser source having an input for connection to a modulating input voltage signal to produce an output modulated optical signal including input signal and noise/nonlinearity components, a detector for detecting the output signal and producing an output voltage signal proportional to the output optical signal, a tapping device connected to the modulator input to tap off a portion of the modulated input signal to produce a reference signal, a delay device for introducing a phase delay of 180° between the reference signal and detector output signal, a comparator for comparing the detector output and reference signals and subtracting the reference signal from the detector output signal to produce an error signal proportional to the noise and distortion components of the modulated output signal, and an external modulator connected to the comparator output and intensity modulated by the error signal to reduce or cancel the noise and distortion components in the modulated optical output signal.

In this manner, the laser noise and/or distortion can be substantially reduced or cancelled. A suitable time delay is built into the signal path from the tapping device to the comparator or subtraction device so that a signal traveling from the modulator input to the subtraction junction via the detector is offset by exactly 180° from the signal path via the tapping device, cancelling the modulated input signal to leave an error signal consisting of the noise and distortion components. An optical time delay is also built into the path from the laser output to the external modulator to ensure that the error signal travelling to the external modulator is also offset 180° from the signal output travelling from the laser to the external modulator, so that the noise component can be substantially cancelled from the signal.

This arrangement produces a significant reduction in laser noise/nonlinearity and thus substantially increases the dynamic range of the optical transducer, eliminating one of the last stumbling blocks to using fiber optics for high fidelity remote analog sensor data transfer.

The optical transducer may be either a laser diode modulated directly or a solid state continuous wave laser with an external modulator. The detector may comprise a standard monitor photodiode for detecting off the rear facet of the laser, as is provided in a standard laser package. Alternatively, a separate, external detector may be coupled via a suitable optical coupler with dual output ports to the laser output. The transfer function of the external detector will be easier to specify than that of the in-built detector in the laser package, and the latter option is thus more practical.

BRIEF DESCRIPTION OF THE DRAWINGS

The present invention will be better understood from the following detailed description of some preferred embodiments of the invention, taken in conjunction with the accompanying drawings in which like reference numerals refer to like parts, and in which.

DESCRIPTION OF THE PREFERRED EMBODIMENTS

Figure 1:
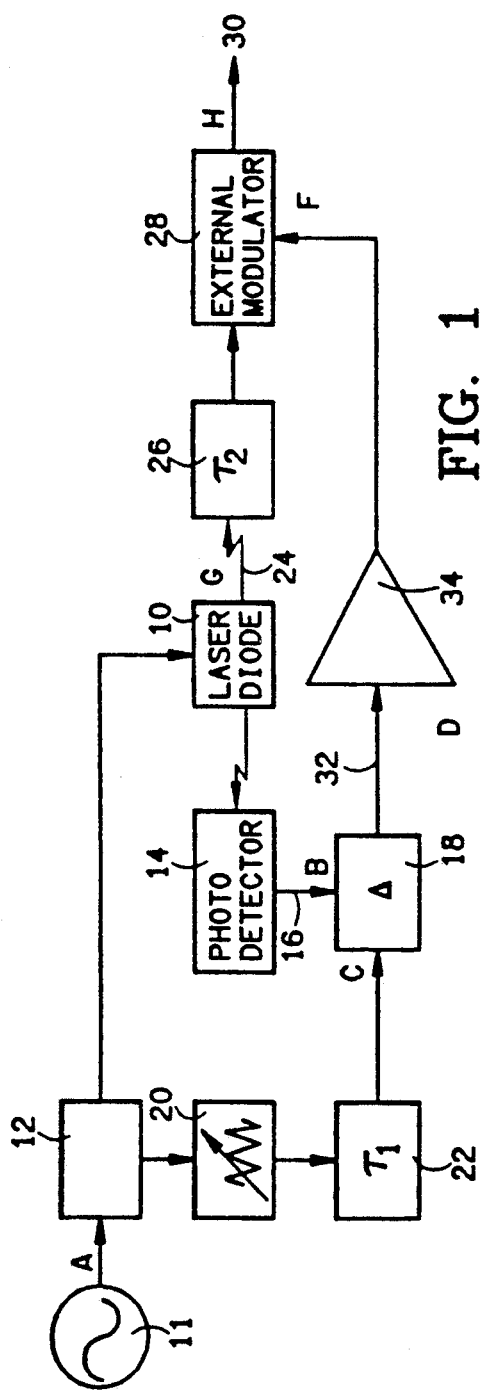
FIG. 1 is a schematic illustrating an optical modulator noise reduction circuit according to a first embodiment of the present invention.

FIG. 1 illustrates a first circuit according to an initial embodiment of the invention for reducing or cancelling the noise and distortion of an optical modulator or laser device. In FIG. 1, the optical modulator is a laser diode 10 to which an input radio frequency source 11 is connected via tapping unit 12. A wide bandwidth detector 14 is connected to detect signals off the rear facet of the laser diode 10. Detector 14 may be a standard monitor photodiode provided in most laser packages or an additional, external photodiode. The detector output 16 is connected to one input of a comparator or subtraction unit 18, which may be a 0°/180° Balun. A small portion of the input radio frequency modulation signal A is tapped off from tapping unit 12 and connected via variable attenuator 20 and time delay unit 22 to the other input of subtraction unit 18.

The optical signal output 24 of the laser diode 10 is connected via optical time delay unit 26, which may comprise a reel of optical fiber, for example, to an external modulator 28 having an output 30. The output 32 of subtraction unit 18 is connected to the external modulator 28 via error amplifier 34 for intensity modulation of the external modulator. The time delay unit 22 is arranged to phase match the signals traveling to subtraction unit 18 so that they are exactly 180° out of phase and of equal time delay. The variable attenuator is used to match the sampled signal amplitude at C to the sampled laser output amplitude at B, and can be suitably varied for changes in laser amplitude over the lifetime of the laser. A signal travelling from a point A to point B will be equally delayed and 180° out of phase with an amplitude matched signal traveling from point A to point C. The optical time delay unit 26 is designed so that the time delay and phase difference between signals traveling along the path ABDFH and those traveling along the path AGH are also matched and 180° out of phase. Fine tuning may optionally be provided via a variable attenuator (not illustrated) and delay unit (not illustrated) in the path from the subtraction unit to the external modulator.

The laser diode 10 is intensity modulated by the input signal 12 to be sent. The output 24 from the laser diode 12 will include both the modulation signal, the modulation distortion and laser noise. The photodetector 14 detects the same signal off the rear facet of the laser diode and will therefore produce an output signal 16 which is proportional to the modulation, the distortion and the laser noise. The same modulation signal tapped from the modulation input via attenuator 20 is subtracted from the signal 16 via subtraction unit 18. Since the two signals are amplitude matched, time delay matched and 180° out of phase, this will substantially or exactly cancel the modulation signal (producing a 2 vector null) leaving an RF distortion and noise output 32 proportional to the laser noise and distortion components. The residual, uncancelled output from the subtraction unit 32 is amplified by the error amplifier 34 and applied to the external modulator 28. All of the RF signals at the subtraction unit output include a 180° phase shift due to the subtraction unit function. The external modulator provides additional intensity modulation to the optical signal originating from the laser diode. The additional modulation consists primarily of the distortion and noise components, derived from the subtraction unit. The time delays, phase offset and amplitudes of the signals combining at the external modulator output 30 are designed to substantially cancel the distortion and noise components of the laser diode and to produce substantially no effect on the original modulating signal. Thus a "noise/distortion" null is produced which enhances the dynamic range of the optical transducer and can be connected to improve on the performance of a fiber optic communication system.

Preferably, the RF components in the correction path are connected via micro-strip transmission lines to control the number of wavelengths and realize phase stable circuits.

The required gain of error amplifier 34 can be calculated as follows according to the laser diode and detector specifications. If it is assumed that the average power into the detector is $5 \times 10^{-3}$ Watts, the detector responsivity is 0.7 Amps/Watt, and the detector load impedance is 50 ohms, then the signal level out of the detector will be $-35$ dBW for 100% modulation. For a typical laser diode the output signal to noise ratio (SNR) will be approximately $-120$ dB/Hz and thus the noise power will be $-155$ dBW/Hz. This is equivalent to a modulation of 0.0001%. Assuming a laser modulation efficiency of 0.05 mW/mA and a 50 ohm laser input impedance, the required modulation power is 1.00 Watts (0 dBW). Assuming it takes 10 $V_{pp}$ to produce 100% modulation in the external modulator, the required drive to produce 0.0001% modulation is $10^{-5}$ Volts ($-126$ dBW). Thus, the required amplifier gain is 29 dB. The error amplifier is expected to have a noise figure of about 3.0 dB which yields an output power level of $-172$ dBW/Hz. This causes a modulation level of 0.0000005%. Consequently, the output noise floor of the laser diode is improved by 46 dB under best case noise suppression conditions with the circuit illustrated in FIG. 1. For the best case noise and distortion suppression conditions to prevail, the transfer function of the laser, detector, subtracter, error amplifier and external modulator correction path must exactly cancel the direct laser to external modulator path noise and distortions. Any amplitude or phase distortion in the correction path introduced by the electronic components will limit the amount of improvement. At the assumed power level of $5 \times 10^{-3}$ W into the detector, the detector shot noise power will be approximately $-192.5$ dBW/Hz which is 8.5 dB higher than the amplifier thermal noise. This will limit the maximum improvement to (46-8.5) or 37.5 dB, best case.

The cancellation circuit therefore feeds forward a noise/distortion component extracted from the laser output modulation+noise/distortion signal to an external modulator, where it is used to substantially cancel or decrease the noise/distortion signal. Since the modulating source can significantly limit the dynamic range in any optical fiber link, the increase in dynamic range of the laser diode produced by the substantial reduction in noise and distortion will effectively increase the dynamic range of the entire link up to the same factor. The use of this noise and distortion suppression circuit also reduces the effects of nonlinearities produced by external modulators when used as sources. This compensates for one of the last stumbling blocks to using fiber optics for remote sensor data transfer and optical signal processing.

Figure 2:
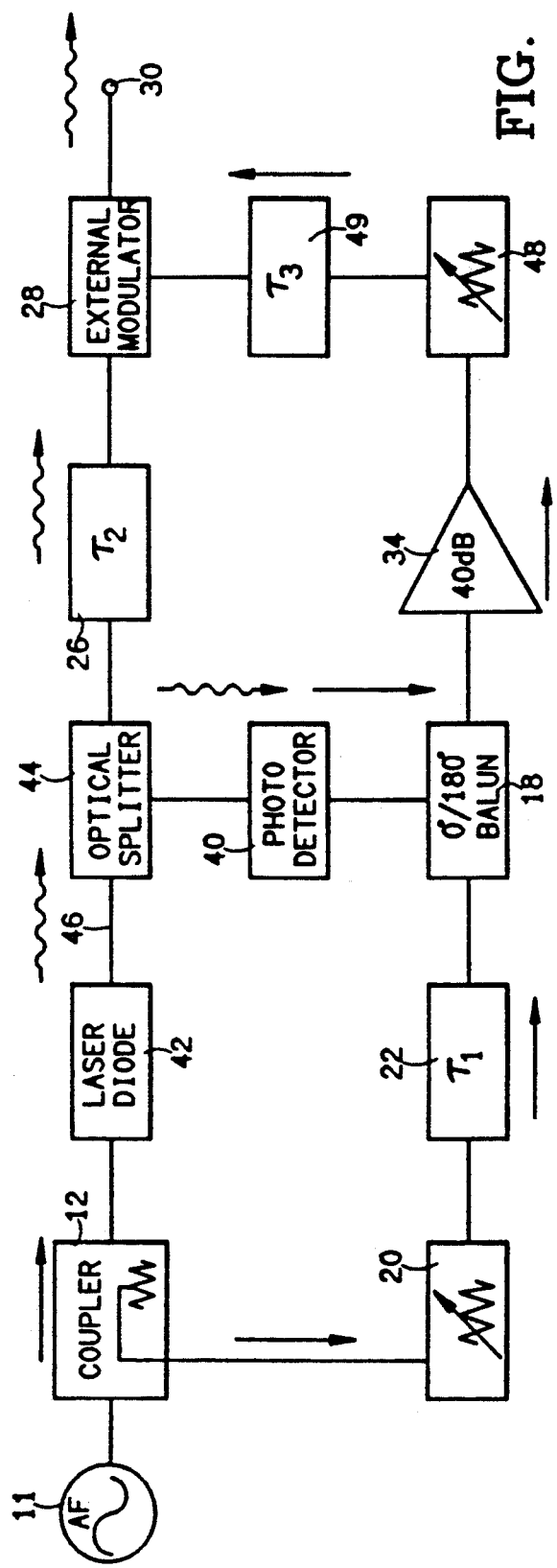
FIG. 2 is a schematic similar to FIG. 1 but illustrating a modified embodiment of the invention.

The photo-detector may be the monitor detector provided in the laser package. However, such built-in monitor detectors are normally of low quality and low bandwidth, and in the embodiment illustrated in FIG. 1 an additional, wide bandwidth detector preferably replaces the built-in monitor. A more practical, cost effective arrangement is illustrated in the modified circuit of FIG. 2, where an additional, external photodiode 40 is connected to the laser diode 42 via one of the output ports of an optical splitter or coupler 44 which is fusion spliced to the laser output 46. The circuit in FIG. 2 is otherwise similar to that of FIG. 1, and equivalent reference numerals have been used where appropriate. The optical time delay unit 26 is connected to the other output port of coupler or splitter 44. The transfer function of external photodiode 40 will be easier to specify than the monitor photodiode incorporated in the laser package, making it easier to phase and amplitude match the signal paths to produce the desired signal nulls. In FIG. 2, an additional variable attenuator 48 and time delay unit are connected in series between error signal amplifier 34 and external modulator 28. This allows a greater degree of fine tuning for matching the RF signal amplitudes out of the external modulator and providing the 180° phase difference, with equal time delays, between the optical and RF inputs. The operation of the circuit illustrated in FIG. 2 will be otherwise equivalent to that of FIG. 1, as described above.

Figure 3:
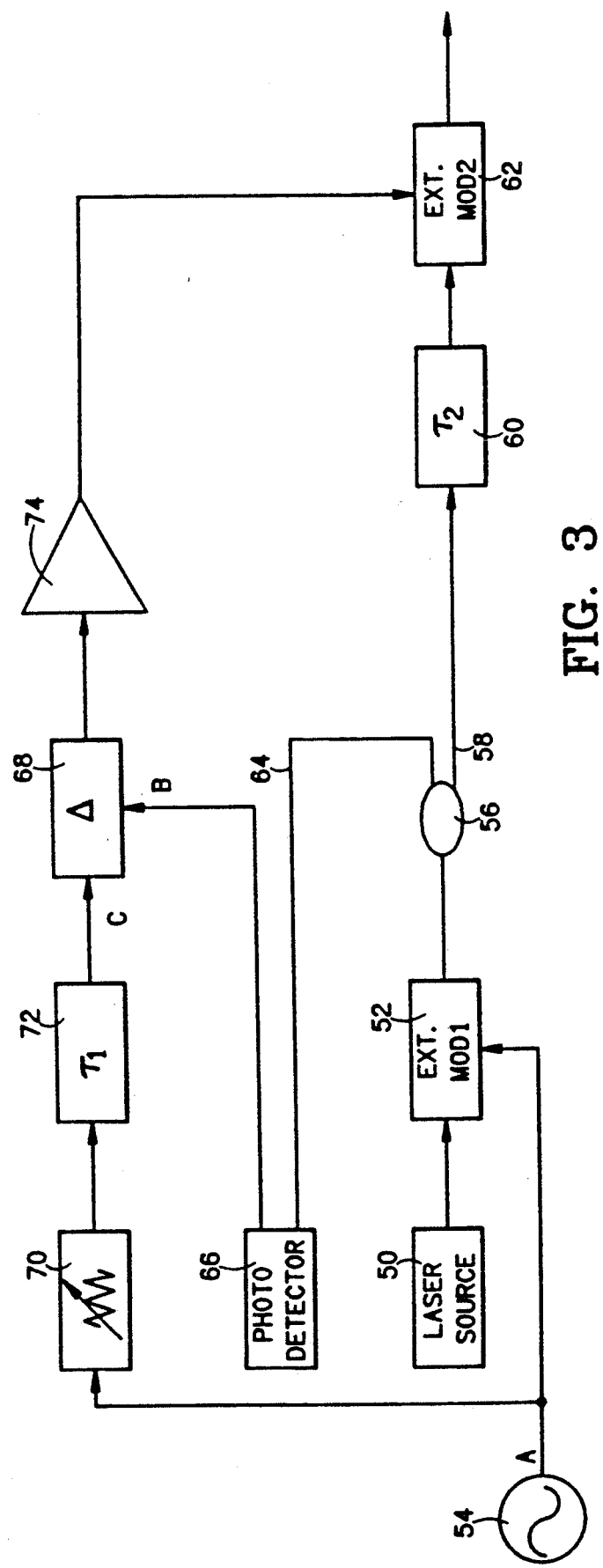
FIG. 3 illustrates a third embodiment of the noise reduction circuit of this invention.

The optical modulator used in the circuits of FIGS. 1 and 2 is direct, on the laser diode. FIG. 3 illustrates a similar arrangement for a solid state laser source 50 with its own external modulator 52. The input modulation signal 54 is connected to the external modulator input, and the output of modulator 52 is fusion spliced to optical coupler or splitter unit 56 having a first output 58 connected via time delay unit 60 to a second external modulator 62 which is equivalent to modulator 28 in the first two embodiments. The second output 64 of coupler unit 56 is connected to a suitable wide bandwidth photodetector 66, and the output of photodetector 66 is connected to one input of subtraction unit 68. A portion of the input modulation signal 54 is tapped off via variable attenuator 70 and delay unit 72 to the other input of subtraction unit 68. The output of subtraction unit 68 is connected via error amplifier 74 having a predetermined gain, according to the specifications of the detector and laser source, to the external modulator 62.

As discussed above in connection with FIG. 1, the gain of amplifier 74 is arranged for matching the amplitudes of the RF error signal and laser output signal at the second external modulator 62. In this embodiment, the correction circuit will correct for noise and distortion effects of the first external modulator as well as the laser source since the detector is connected at the output of the external modulator. This is important since, in the illustrated case, laser relative intensity noise (RIN) is not as critical as external modulator nonlinearities, which will create undesired distortions. The correction circuit subtracts the modulation signal from the combined modulation and error (noise and distortion) signal at the subtracter circuit output to produce an RF null and leave a signal equivalent to the laser and external modulator noise and distortion components at the input of the error amplifier. This is amplified and used to intensity modulate the second external modulator in order to cancel or substantially reduce the noise and distortion components of the signal. As in the first and second embodiments, the attenuator and time delay are used to match the amplitude and time delay from A to B with that from A to C (see FIG. 3) so that the amplitudes are matched and the signals out of phase. The optical time delay unit 60 matches the optical time delay with the RF path at the second external modulator.

In the embodiment of FIG. 3, the laser relative intensity noise(RIN) levels are not as critical as external modulator nonlinearities which create harmonic and intermodulation distortions. The cancellation circuit will reduce or cancel any such nonlinearities as well as noise, increasing the dynamic range of the optical link. The arrangements illustrated in FIGS. 2 and 3 provide economic and efficient circuits for reducing noise and distortion in existing laser sources without re-designing the laser source itself. The circuit requires only a few, standard components and can be quickly and easily adjusted for the particular laser source. This arrangement substantially increases the dynamic range and fidelity of optical modulators, and compensates for one of the major problems involved in using fiber optics for remote sensor data transfer and optical signal processing.

In the 2-4 GHz range, the limiting devices are the external modulator and the laser diode. The external modulator should be produced so that the RF response is relatively flat, along with the other components, over the 2-4 Ghz range to provide good results. Note that only a small portion of the dynamic range of the external modulator is required since only the laser noise and distortion products are being modulated onto the optical carrier. The laser diode should provide high optical power to maximize RIN and distortion availability to the suppression circuits and deliver high output from the external modulator, as well as operate in the 2-4 GHz range. An examination into existing laser diodes and external modulators indicate that devices with these specifications exist, although they must selected. Devices with lower performance could be used, but with some limitation in the results. RF simulations based on high performance RF components have been made. These simulations exclude temperature effects. The simulators indicate a nulling of the optical noise path of $-14$ dB is possible, with available component parameters in this frequency range. Packaged components would probably reduce this result.

Although some preferred embodiments of the invention have been described above by way of example only, it will be understood by those skilled in the field that modifications may be made to the disclosed embodiments without departing from the scope of the invention, which is defined by the appended claims.

I claim:

1. An optical modulator noise reduction circuit, comprising:
    an optical modulator having an output for producing a modulator output signal comprising a combination of an optical modulation signal and a noise and distortion signal in response to an input modulation signal;
    detector means for detecting said modulator output signal and producing a detector output signal proportional to said modulator output signal, said detector output signal having an output phase, an output amplitude, and an output time delay;
    tapping means for tapping off a portion of said input modulation signal to produce a reference signal having a reference phase, a reference amplitude, and a reference time delay;
    subtraction means for subtracting said reference signal from said detector output signal to produce an error signal proportional to said noise and distortion signal;
    external modulator means connected to the output of said optical modulator; and
    connecting means for connecting said error signal to said external modulator means for intensity modulating said modulator output signal provided to said external modulator means to substantially cancel said noise and distortion signal from said modulator output signal.

2. The circuit as claimed in claim 1, wherein said optical modulator comprises a laser source having a rear facet and said detector means comprises a photodetector connected to detect reflections from said rear facet of the laser source.

3. The circuit as claimed in claim 1, including optical splitter means fused to the output of the optical modulator and having first and second outputs, one of said splitter outputs being connected to said external modulator and the other splitter output being connected to said detector means.

4. The circuit as claimed in claim 1, wherein said subtraction means includes amplitude and phase matching means for matching the output amplitude and output phase with the reference amplitude and reference phase so that the output and reference amplitudes and the output and reference time delays are substantially matched and they are 180° out of phase at said subtraction means.

5. The circuit as claimed in claim 1, including delay means in the optical path between said optical modulator and external modulator for matching the optical signal path length from said optical modulator to, said external modulator with the path length via said detector and subtraction means to said external modulator so that the error signal is 180° out of phase with the optical signal at said external modulator.

6. The circuit as claimed in claim 1, including amplification means connected between said subtraction means and external modulation means for amplifying said error signal to a predetermined level.

7. The circuit as claimed in claim 1, wherein said optical modulator means comprises a laser diode.

8. The circuit as claimed in claim 1, wherein said optical modulator means comprises a solid state laser source and an additional external modulator connected to the output of said laser source, said detector means being connected to detect the output of said additional external modulator.

9. An optical modulator noise reduction circuit, comprising:
    an optical modulator having an output for producing a modulator output signal comprising a combination of an optical modulation signal and a noise and distortion signal in response to an output modulation RF signal;
    detector means for detecting said modulator output signal and producing an output RF signal proportional to the detected modulator output signal, said output RF signal having an output phase, an output amplitude and an output time delay;
    tapping means for tapping off a portion of said input modulation signal to produce a reference RF signal having a reference phase, a reference amplitude and a reference time delay;
    subtraction means having inputs connected to said detector means and tapping means for subtracting said reference signal from said detected signal to produce an error signal proportional to said noise and distortion signal;
    amplitude and phase matching means connected in the path between at least one of said detector and tapping means and said subtraction means for matching the amplitude and phase of said optical modulation signal and said noise and distortion signal at the input to said subtraction means such that the output and reference amplitudes and time delays are substantially matched and the signals are 180° out of phase;
    external modulator means connected to the output of said optical modulator; and
    connecting means connecting the output of said subtraction means to said external modulator for intensity modulating the input optical signal to substantially cancel said noise and distortion signal.

10. A method of reducing the noise and distortion component of an optical modulator output signal, comprising the steps of:
    detecting the output optical signal from an optical modulator and producing a detector output signal proportional to the optical modulator output;
    tapping off a portion of the input modulation signal to the modulator to provide a reference signal;
    matching the output phase and output amplitude with the reference phase and reference amplitude so that the output and reference amplitudes and time delays are substantially matched and the signals are 180° out of phase;
    subtracting the reference signal from the matched detector signal to produce an output error signal proportional to the noise and distortion components of the optical output signal; and adjusting the optical output signal with the error signal to reduce the noise and distortion components of the signal.

* * * * *

UNITED STATES PATENT AND TRADEMARK OFFICE
CERTIFICATE OF CORRECTION

PATENT NO. : 5,166,509

DATED : November 24, 1992

INVENTOR(S) : Mark E. Curran

It is certified that error appears in the above-identified patent and that said Letters Patent is hereby corrected as shown below:

On title page, item [54] and col. 1, lines 1-2
    title should read:

--OPTICAL MODULATOR NOISE AND NONLINEARITY REDUCTION CIRCUIT--

Signed and Sealed this

Sixteenth Day of November, 1993

Attest:

BRUCE LEHMAN

*Attesting Officer*   Commissioner of Patents and Trademarks